May 12, 1942.　　R. B. MITCHELL　　2,282,670

FLAME HARDENING PROCESS AND APPARATUS

Filed Sept. 15, 1941　　7 Sheets-Sheet 1

May 12, 1942. R. B. MITCHELL 2,282,670
FLAME HARDENING PROCESS AND APPARATUS
Filed Sept. 15, 1941 7 Sheets-Sheet 2

INVENTOR.
Robert Baxter Mitchell
BY
David A. Fox
ATTORNEY

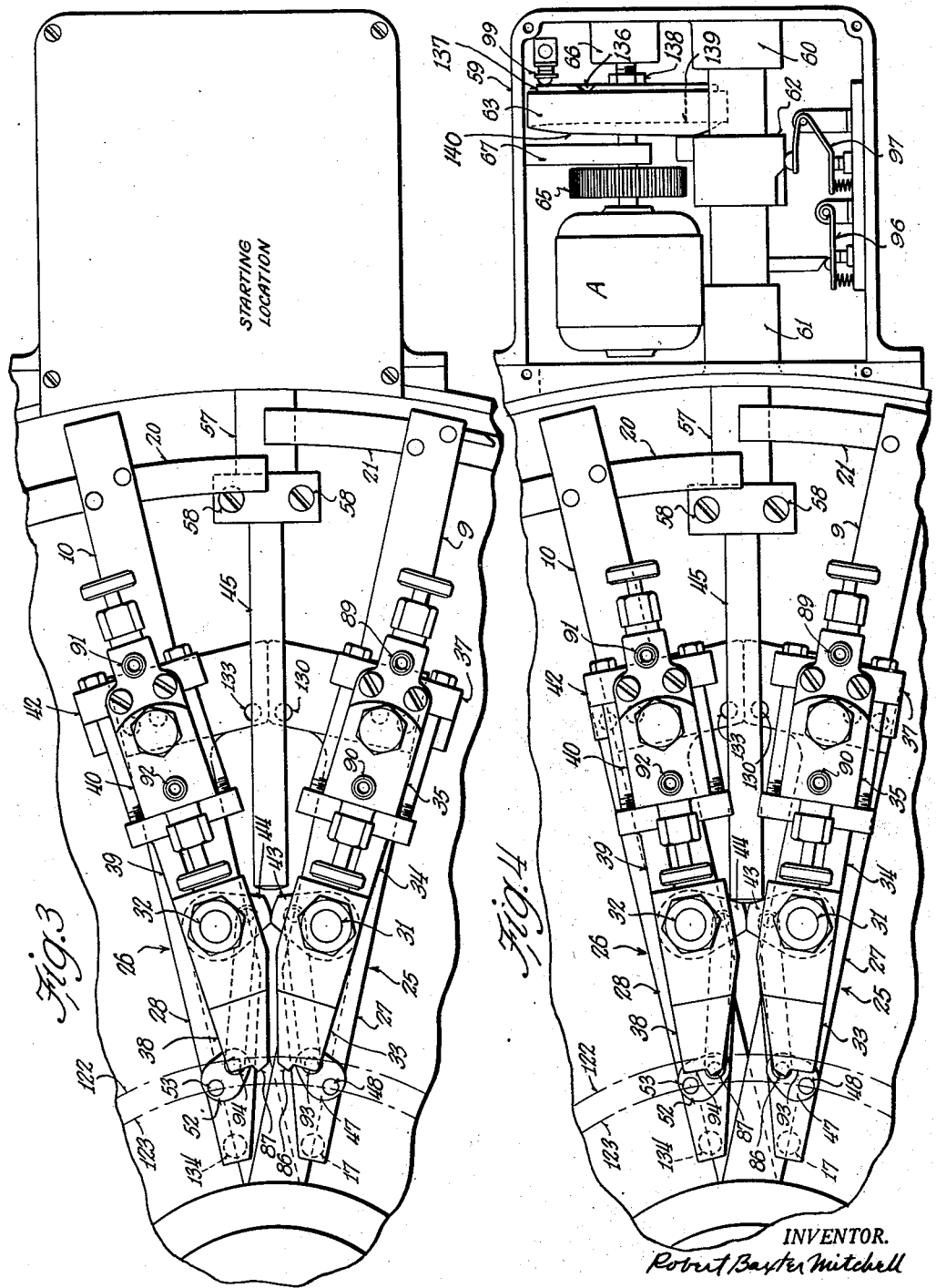

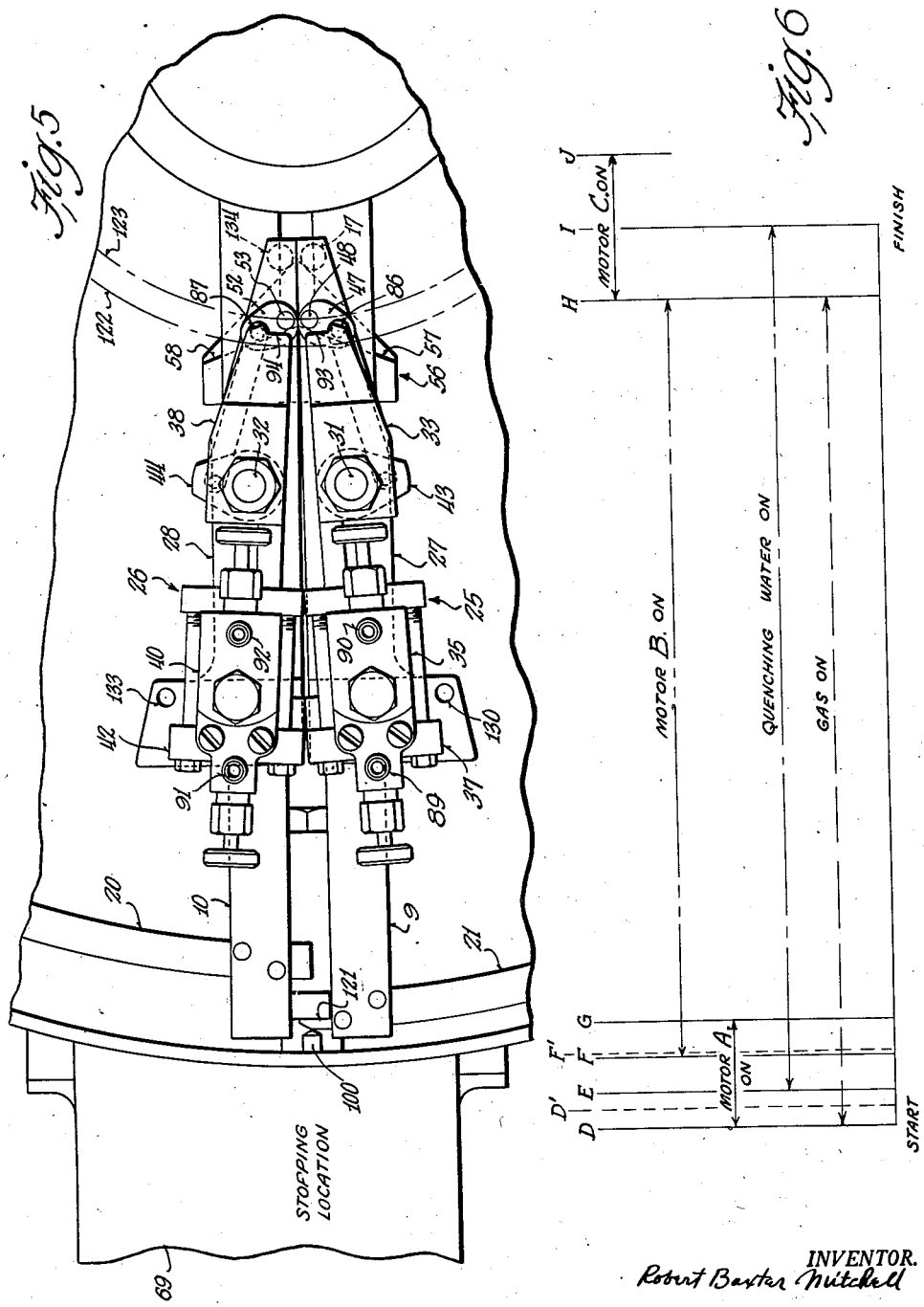

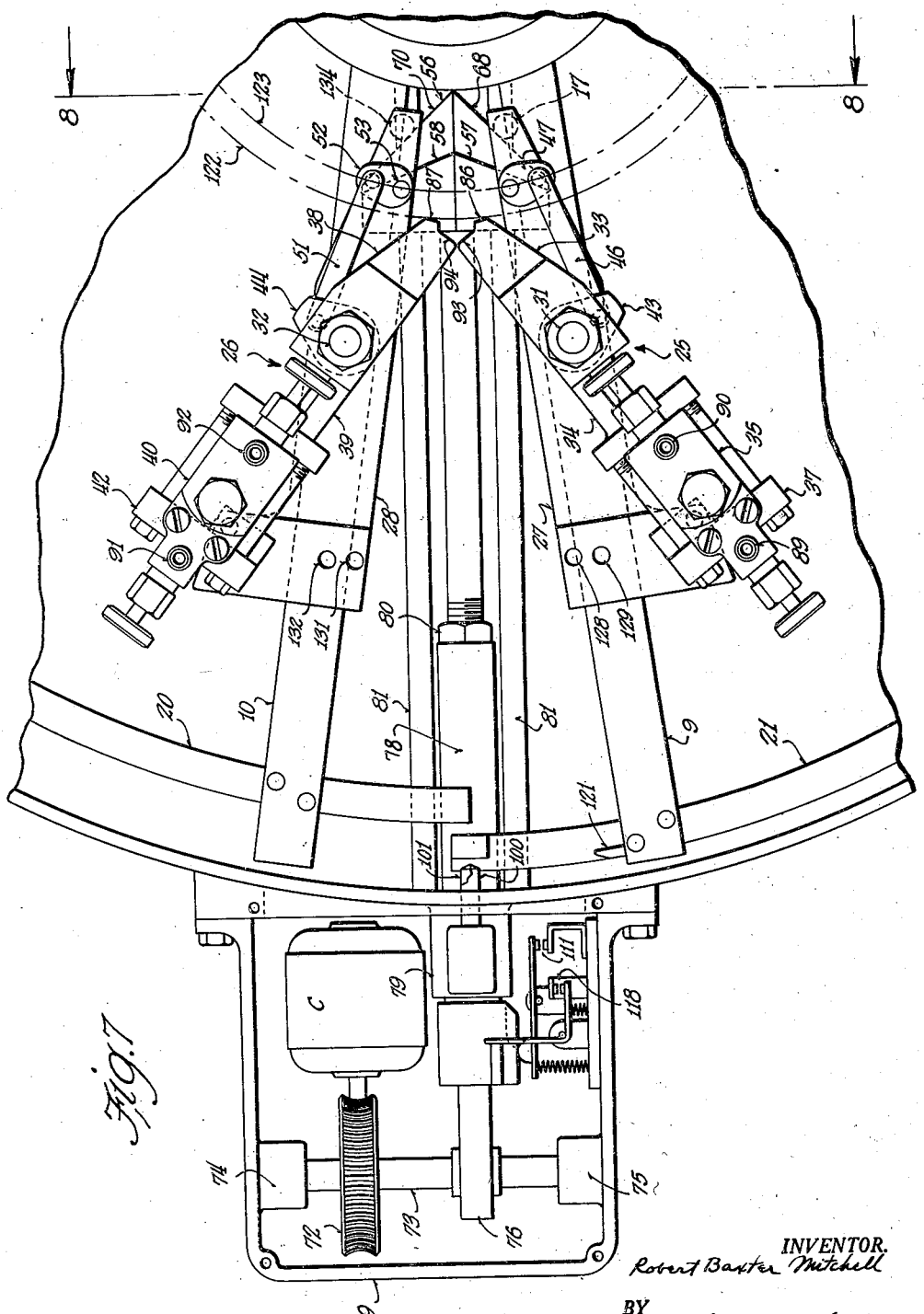

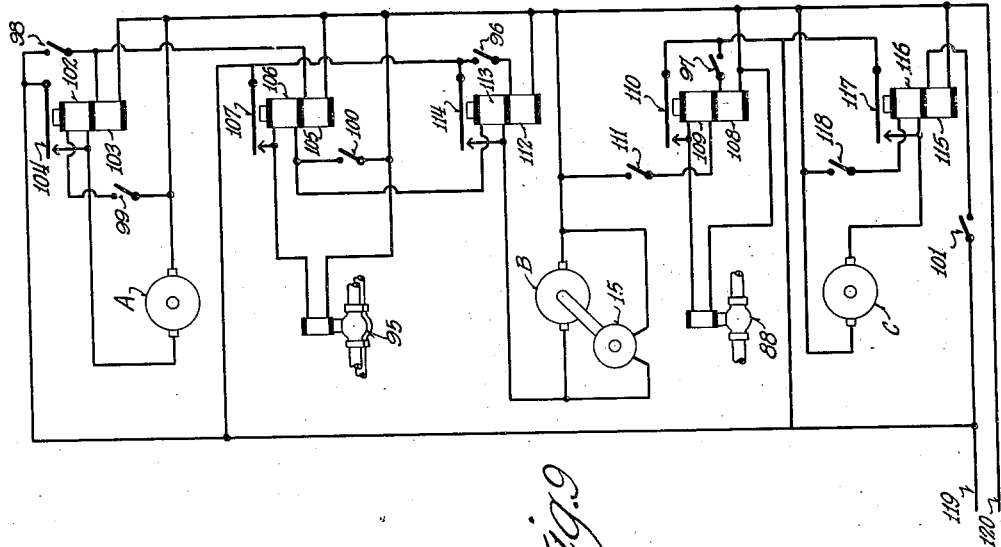
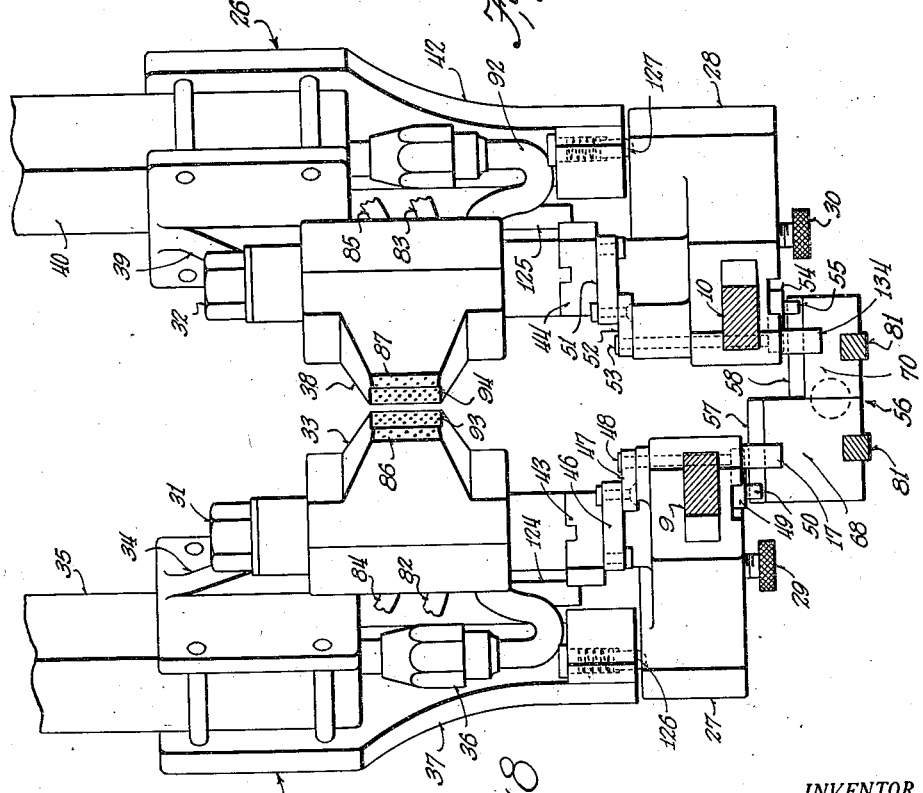

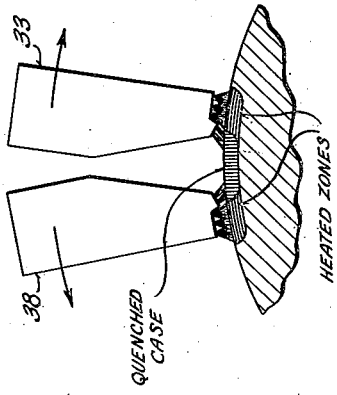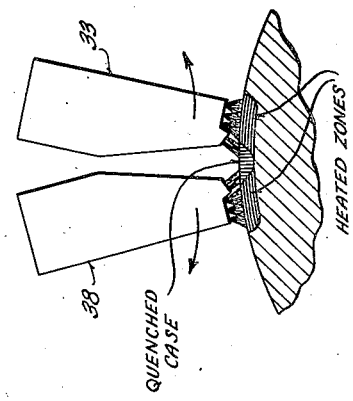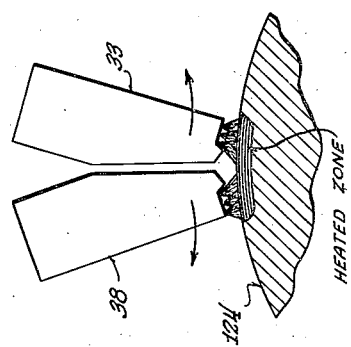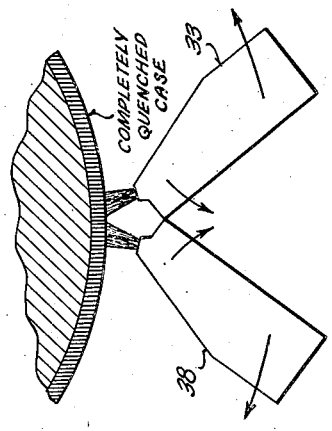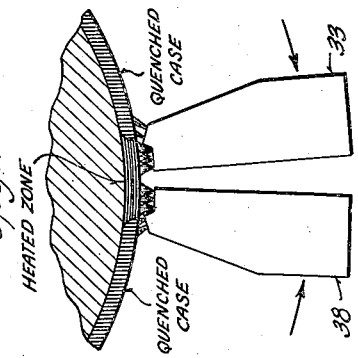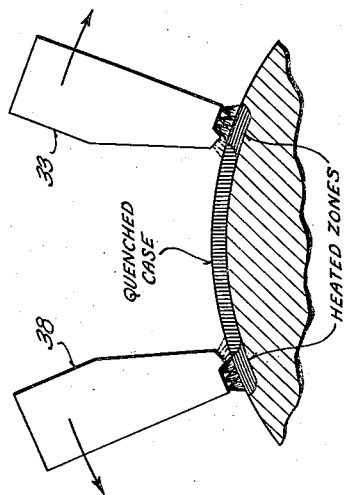

Patented May 12, 1942

2,282,670

UNITED STATES PATENT OFFICE 2,282,670

FLAME HARDENING PROCESS AND APPARATUS

Robert Baxter Mitchell, Milwaukee, Wis., assignor to Harnischfeger Corporation, Milwaukee, Wis., a corporation of Wisconsin Application September 15, 1941, Serial No. 410,919

18 Claims. (Cl. 148—21)

This invention relates to apparatus and methods for hardening a surface layer on a quench-hardenable material by means of travelling application of very rapid heating with sequential application of a quenching medium. The invention resides in improvements therein involving a pair of separable heat sources which are applied side by side to the surface of an object at the outset of divergent movement between said sources, such application of heat being followed by application to the initial zone of heating of separable supplies of a quenching medium, which supplies travel behind and in consonance with the movement of said heat sources until said heat sources have covered the area to be treated or until said heat sources meet with themselves or other travelling heat sources, whereupon they are extinguished, while said travelling quench supplies continue to move to meet themselves or other travelling quench supplies to quench the terminal zone of heating formed by the extinguished heat sources.

One object of this invention is to provide an apparatus and method by which a continuous peripheral band of hardened material may be produced on the surface of a body. Other objects and advantages will be apparent from the description of the invention as it proceeds.

By applying to and progressively advancing an intense heat source over the surface of an object formed of a quench-hardenable alloy, a surface zone of limited penetration can be raised to temperatures at or above the critical or hardening temperature without burning the alloy. When the heated zone thus produced is sequentially quenched by a source of quenching medium, a hardened surface layer is produced on the alloy object. All of this is well known and those familiar with this art fully understand the conditions under which hardened casings of desired properties can be produced in this way. A serious limitation of the method, however, has heretofore been the impossibility of producing a continuous peripheral hardened band. For example, in hardening the cylindrical surface of the rim of a disc by the old, well-known progressive treatment, which runs around the rim, a softer annealed strip is always left, extending across the rim just ahead of the point where treatment is terminated. If the tire of a car wheel, or other similar object, is to be hardened this soft spot is very objectionable. To avoid this some have proposed to treat cylindrical surfaces by passing the heat source and quench thereover in a closely spaced helical path, but when this is done non- uniformity of properties in an axial direction is encountered. Others have proposed to heat the entire rim of the wheel and then to quench it at one time. It is very difficult, if not impossible, to do this and when it is accomplished excessive penetration is obtained and there is a loss of other desirable properties.

In contrast with the above difficulties heretofore experienced in this art, this invention makes possible localized hardening of an unbroken peripheral band around large circular objects, such as car wheels and the like.

This invention is herein described by reference to the accompanying drawings which form a part hereof and in which there is set forth by way of illustration and not of limitation one form of an apparatus constructed in accordance with this invention and adapted for the performance of the process of this invention. In the drawings:

Fig. 3 is an enlarged fragmentary plan view showing the torches in the position which they assume at the outset of the treatment;

Fig. 4 is a fragmentary enlarged plan view showing the torches moved to normal position just after the outset of the treatment;

Fig. 5 is an enlarged fragmentary plan view showing the torches in the stopping position near the end of the treatment of the wheel;

Fig. 6 is a diagrammatic representation of cycle sequence involved in the treatment by the apparatus of Fig. 1;

Fig. 7 is an enlarged fragmentary plan view showing the torches in the position assumed at the conclusion of the treatment;

Fig. 8 is a fragmentary view in elevation, viewed from the center of the machine, of the torches in the position in which they are shown in Fig. 7, viewed through plane 8—8 of Fig. 7;

Fig. 9 is a wiring diagram of the electrical circuit of the apparatus shown;

Fig. 10 is a diagrammatic representation of the flames and the effect thereof during the preheating period while the torches are still at rest at the outset of the treatment;

Fig. 11 is a diagrammatic representation of the flames and the effect thereof and quenching streams after the torches have started to tilt Fig. 12 is a diagrammatic representation of the flames and quenching streams and the effect thereof after the torches have completed their tilting movement at the outset of the travel of the carrier arms;

Fig. 13 is a diagrammatic representation of the flames and quenching streams and the effect thereof during normal running;

Figure 1:
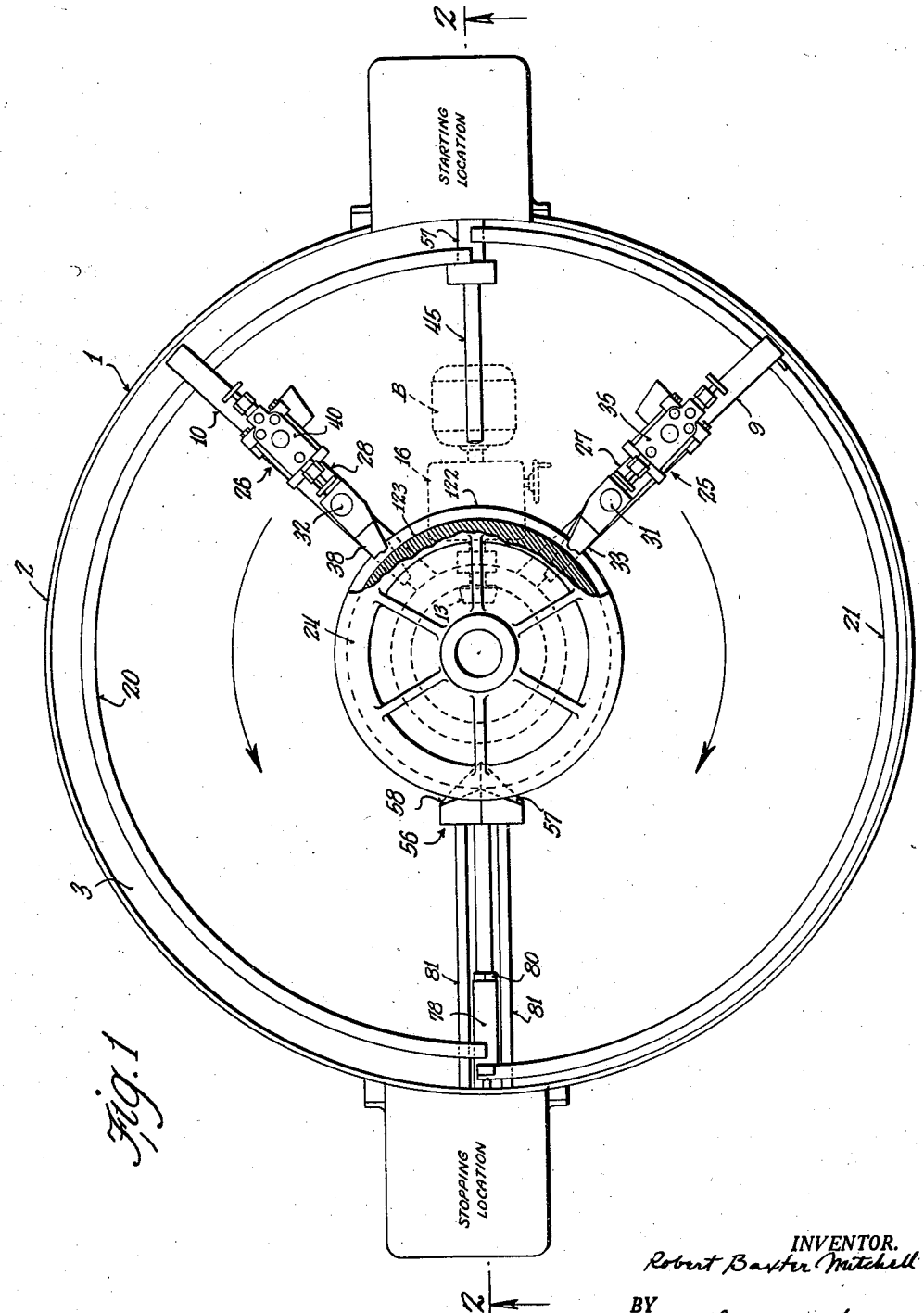
Fig. 1 is a plan view of one form of the apparatus of this invention showing a wheel in position to be treated, a portion of the rim of the wheel being shown broken away.

Fig. 14 is a diagrammatic representation of the flames and quenching streams and of the effect thereof at the point of remerging of the flames and just before the torches start their final tilting; and Fig. 15 is a diagrammatic representation of the remerged quenching streams at the end of the treatment after the torches have completed their final tilting movement, showing the completely quenched band.

Throughout the several views of the drawings, like numerals and reference characters are applied to like parts of the apparatus shown.

Referring now to the several views of the drawings, the form of the apparatus shown is mounted upon circular basin 1, which forms the principal framework for the apparatus. As appears clearly in Fig. 2, the basin 1 is formed of a vertical cylindrical wall 2 and a horizontal bottom 3. Secured centrally in the bottom 3 is a vertically standing sleeve 4 which surrounds a stationary column 5. The column 5 is held securely in place by being bolted, as shown, to a subframe 6. Within the cylindrical clearance between the gudgeon 5 and the sleeve 4 there are positioned concentric quill-shafts 7 and 8, which carry at their upper ends carrier-arms 9 and 10, respectively.

Secured to the lower ends of the quill-shafts 7 and 8 are inwardly-facing beveled gears 11 and 12, respectively. Arranged in meshing relationship with the beveled gears 11 and 12 is a beveled pinion 13 which is mounted upon a shaft carried by a bearing support 14. Drivingly connected to the pinion 13 and its shaft is a magnetically-actuable clutch 15, which is arranged to be driven by a variable speed-reduction gear 16 and a motor B.

The ends of the carrier-arms 9 and 10 are provided at their outer ends and beneath the same with small, radially-disposed rollers 18 and 19, which are properly located to engage semi-circular track members 20 and 21. The semi-circular track members 20 and 21 are secured to and elevated above the bottom member 3 a sufficient amount to furnish vertical support for the outer ends of the carrier-arms 9 and 10, as appears more clearly in Fig. 2.

Mounted above and secured to the gudgeon-shaft 5 is a work-table 22 upon which a centering plate 23 is mounted. The centering plate 23 is adapted to receive a work piece 24 and to hold the same in a position concentric with the axis of movement of the carrier-arms 9 and 10. The centering plate 23 is removable and may be replaced by any configuration of centering plate which may be required, to properly support and position work pieces of varying configuration.

The parts of the apparatus thus far described constitute the primary support for the machine itself and the carrying mechanism by which flame-hardening instrumentalities are carried in concentric paths around the periphery of a circular work piece. With the clutch 15 disengaged, the carrier-arms 9 and 10 may be manually drawn to a position in close proximity to one another at the starting location, as shown in Fig. 3. When the motor B is operated and the clutch 15 is engaged, the carrier-arms 9 and 10 move simultaneously in the direction indicated by the arrows in Fig. 1 and such movement continues until the carrier-arms are again in close proximity to one another at the stopping location, as shown in Fig. 5.

The rate of travel of the carrier-arms 9 and 10, while being driven as just explained, may be regulated by adjustment of the variable reduction gearing 16.

Mounted upon the carrier-arms 9 and 10 are flame-hardening torch assemblies 25 and 26. The two torch assemblies are symmetrical counterparts of one another and derive their support from adjustable saddles 27 and 28, which slidingly engage the carrier-arms 9 and 10. The saddles 27 and 28 may be adjusted inwardly and outwardly upon the carrier-arms 9 and 10 and may be held in any said adjusted position by the clamping screws 29 and 30 so as to accommodate work pieces of different diameters.

Rising vertically from each of the saddles 27 and 28 are pivot posts 31 and 32. Mounted to turn as a rigidly associated unit upon the pivot 31 are a torch jet portion 33, a bracket 34, a gas mixing chamber 35, gas supply piping 36, and a supporting foot 37. In like manner, symmetrically similar parts 38, 39, 40, 41 and 42 are mounted upon the pivot post 32 to pivot thereon as a unit. Formed as a part of bracket 34 and thus associated with the jet portion 33 to turn therewith is a combined cam-and-rocker arm 43. A symmetrical counterpart thereof is provided in cam-and-rocker arm 44, which, being formed as a part of bracket 39, is associated with the jet portion 38 to turn therewith.

It will be apparent from an inspection of Figs. 3 and 4 that an inwardly-acting radial plunger-rod 45, by acting inwardly to engage the cam surfaces of rockers 43 and 44, may cause a diverging tilting movement of the torch assemblies 25 and 26. The condition under which this is caused to occur in the apparatus of this invention will be more fully described hereinafter.

Figure 2:
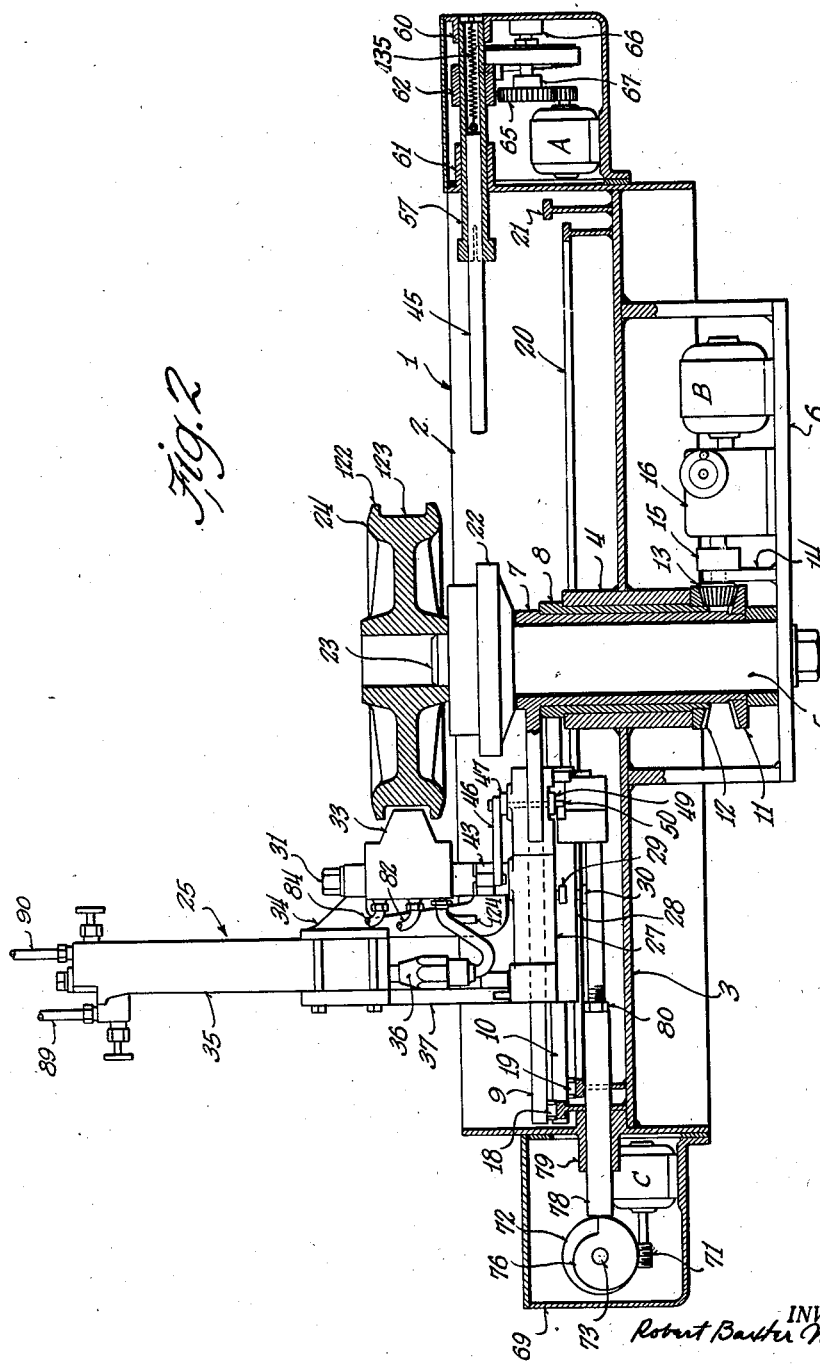
Fig. 2 is a side elevation in section of the apparatus shown in Fig. 1, viewed through a plane indicated by the line 2—2 in Fig. 1.

Pivotally connected to the rocker 43 is a connecting link 46 which in turn makes pivotal connection with a bell-crank arm 47, as shown more clearly in Figs. 2 and 8. The bell-crank arm 47 is mounted to turn with a crank-pin 48, which extends downwardly through the saddle 27 to a position below the same where it engages and is secured to a bell-crank arm 49. Extending downwardly from the end of the bell-crank arm 49 is a follower-pin 50, which is positioned to be engaged and actuated by an inwardly-acting plow-shaped member 56. Associated with the torch assembly 26 are the corresponding symmetrical parts 51, 52, 53, 54 and 55.

It is apparent that with the parts in the position shown in Fig. 5 and upon inward movement of the plow-shaped member 56 and the engagement of inclined faces 57 and 58 thereof with the pins 50 and 55, respectively, that the torch assemblies 25 and 26 are convergently titled to the position shown in Fig. 7. The condition under which this action takes place in the apparatus of this invention will be more fully described hereinafter.

The inwardly acting, radially disposed ram 45 positioned at the starting location heretofore referred to is depicted in greater detail in Figs. 2 and 4, wherein it appears that the ram 45 is mounted within and securely attached to a driving-sleeve 57. The sleeve 57 as shown in Fig. 2 is parted by a slot at its outer end so that clamping screws 58 may be tightened to hold the ram 45 in any adjusted position desired with reference to the driving-sleeve 57. The driving-sleeve 57 in turn enters a casing 59 within which slideways 60 and 61 are provided to furnish sliding support for the sleeve 57. A spring 135, housed within the sleeve 57 and anchored at its inner end to the plunger 45 and at its outer end to the casing 59, serves to normally urge the ram assembly to its outer position.

Fixed to the sleeve 57 between the guideways 60 and 61 is a cam-follower 62, positioned to be engaged by a crown cam 63. The cam 63 is mounted upon a shaft 64 together with a gear 65, the shaft 64 being carried in bearing supports 66 and 67. A driving motor A, located as shown, is provided with a pinion which meshes with gear 65 so that when the motor A is operated cam 63 is turned.

The crown of cam 63 has a flat portion 139 extending around a substantial part of the circumference and a rising or helical portion 140. When the cam 63 is turned, no movement of ram 45 takes place as long as the follower 62 is in engagement with the flat portion 139, but as soon as the rise 140 engages the follower 62 the ram 45 is moved toward the center of the machine. This inward movement of the ram 45 is the movement which has heretofore been referred to as acting to cause the ends of the torch assemblies 25 and 26 to diverge, when the arms 9 and 10 are positioned at the starting location. Within the housing 59, control means for bringing the motor A to rest and for regulating other functions of the apparatus are included, all as more fully described hereinafter. The motor A is preferably of variable speed type so that the rate of inward movement of ram 45 may be regulated as desired.

On the side of the apparatus opposite the ram 45, at the stopping location, as designated in the drawings, the plow-shaped cam member 56 heretofore referred to, is provided with actuating means for causing its inward movement. These actuating means are housed within a casing 69, shown more clearly in Figs. 2 and 7. Within the casing 69 there is located a variable speed motor C, which carries a worm-pinion 71 upon its shaft. The pinion 71 in turn meshes with worm-gear 72, which is mounted upon the horizontal cross-shaft 73 carried in turn upon bearings 74 and 75, which are mounted on the housing 69. A scroll cam 76, which is carried upon the shaft 73 to be rotated thereby, is positioned to act upon the end of an adjustable push-rod 78, which is arranged for sliding movement in a sleeve 79 provided therefor. The adjustable push-rod 78 cooperatively engages the plow-shaped member 56 so that upon rotation of cam 76 member 56 is moved inwardly to produce the final tilting of the torch assemblies 25 and 26, which has been heretofore referred to. At the center of push-rod 78 adjusting means 80 are provided to permit the adaptation of the apparatus to the treatment of work pieces of different sizes.

In order to guide the plow-shaped member 56 in its movement and in order to furnish support therefor, parallel rails 81, secured to the base 3 in proper position to engage slots in the lower face of member 56, are provided in the manner shown in Fig. 8. A spring, not shown, may be employed to cause return of the push-rod 78 and member 56 after completion of the stroke.

Control means for stopping and starting motor C are contained within the housing 69 and are arranged to be actuated by movement of the push-rod 78 in a manner which will be more fully described hereinafter.

The torch assemblies 25 and 26 heretofore referred to are of a character appropriate for the carrying on of a flame-hardening treatment. Within the jet portions 33 and 38 cooling water passages are provided, in well-known manner, for the purpose of preventing the torch parts from attaining a destructive temperature. Such cooling water is continuously admitted through the conduits 82 and 83, shown broken away in Fig. 8. Waste cooling water is discharged directly into the basin of the machine, through spill pipes 124 and 125. In addition to cooling water thus supplied and disposed of, provision is made for the admission of quenching water through the conduits 84 and 85, also shown in fragmentary form in Fig. 8. The quenching fluid conduits 84 and 85 make direct connection, by means not shown, with quenching fluid jets 86 and 87, respectively, distributed as shown in Fig. 8 over a part of the work face of the respective jets 33 and 38. The admission of quenching fluid to the conduits 84 and 85 is controlled by a valve 88, indicated diagrammatically only in Fig. 9.

Gas-mixing-chambers 35 and 40 are adapted to receive oxygen and acetylene through conduits provided therefor, the same being indicated in the case of mixing-chamber 35 by the numerals 89 and 90, shown in Fig. 2. Similar conduits are provided for supplying gas to mixing-chamber 40, as is indicated in Figs. 3, 4, 5, and 6, the same being designated by the numerals 91 and 92.

The internal construction of mixing-chambers 35 and 40 is such as is used in the case of conventional oxyacetylene torches of known form and is therefore not shown. The mixed gases provided in chambers 35 and 40 are carried through conduits 36 and 92, respectively, to the jet portions 33 and 38, where the same emerge through the flame jet areas 93 and 94, respectively, as shown in Fig. 8.

The gases supplied through the conduits 89, 90, 91 and 92 are controlled by a multiple valve 95, adapted to simultaneously admit or restrict oxygen and acetylene, said valve being shown diagrammatically only in Fig. 9.

In order to carry forward the treatment of a work piece, such as work piece 24, by means of the apparatus thus far described, the carrier arms 9 and 10 are moved manually to the position shown in Fig. 3 and the torch assemblies 25 and 26 are manually tilted to the position there shown. At this stage of the operation, cam 63 will be at its rest position, shown in Fig. 1, with the ram 45 retracted by spring 135. In this position the cam follower 62 is so located that electric contacts 96 and 97 are in open position.

To start, a manually-controlled push-button 98, shown diagrammatically only in Fig. 9, is closed. Simultaneously with the closing of push-button 98 a manually controlled igniting flame, not shown, is applied to the flame jet portions 93 and 94. The closing of push-button 98, as shown in Fig. 9, energizes a coil 105 of a contactor 107, which then closes. Upon the closing of contactor 107, holding-coil 106 becomes energized through a normally closed contact 100, located at the stopping position and to be more fully described hereinafter. Contactor 107 thus closed and maintained closed serves to energize the coil of magnetic valve 95 through which, as previously explained, oxygen and acetylene are simultaneously admitted to the torch assemblies 25 and 26. In this way the flames are supplied and ignited and intense heating of the surface of the work piece 24 will begin to take place under the action of the almost converging flames issuing from the two torches. The manner in which these flames converge and heat the surfaces of the work piece 24 is shown in Fig. 10. At the outset the torches remain stationary for a predetermined interval to insure the desired penetration of heat. This is hereinafter referred to as the stationary preheating period.

The push-button 98, previously referred to, upon closing also energizes magnetic contactor coil 103, causing the contactor 104 to close. When this occurs, current from line lead 119 passes through contactor 104 to the motor A and thence back to the line lead 120. At the same time maintaining-coil 102 becomes energized by current supplied through contactor 104 derived in turn from line lead 119. Return connection from said coil 102 to line lead 120 is provided through a contact 99, which becomes closed as soon as motor A starts to turn cam 63. Contact 99 is so constructed, as shown in Fig. 4, as to remain in engagement throughout the movement of cam 63 except at the position where indentation 136 in an adjustable plate 137 occurs. By this arrangement cam 63 is caused to automatically make one complete revolution and then to stop. By releasing nut 138 the adjustable plate 137 may be shifted to any angular position with respect to cam 63 which is desired and may be clamped in such adjusted position by again tightening the nut 138. In this way the extent of the flat portion of cam 63 passing under the cam-follower 62 between the moment of starting and the time that the rise 140 on cam 63 begins to cause the ram 45 to move, is subject to regulation. This period furnishes a convenient means for regulating the length of the stationary preheating period at the outset of the treatment. The time elapsing during the stationary preheating period is diagrammatically indicated in Fig. 6 by the space between vertical lines D and D'.

Immediately following the stationary preheating period the flames emitted by the jet portions 33 and 38 are moved from the position shown in Fig. 10 to the position shown in Fig. 11, this movement being caused by the rise 140 of cam 63 engaging the cam-follower 62. This results in inward travel of the ram 45 and tilting of the torches, as described. The interval during which tilting of the torches takes place is diagrammatically indicated in Fig. 6 by the portions of the horizontal lines intercepted by the vertical lines D' and F'. At about the same time as the torches 33 and 38 start to tilt apart contact 97 is closed by engagement with the cam-follower 62, thus energizing the coil 108, which causes the contactor 110 to close. When this occurs current is supplied from line lead 119 through contactor 110 to the quenching water control valve 68, thus initiating the supply of quenching fluid through the quenching fluid jets 86 and 87 of the jet portions 33 and 38.

When the cycle reaches this phase, which is represented diagrammatically in Fig. 6 by the vertical line E, motor A is in operation, flames and quenching fluid are being emitted by the jets, and the ends of the jets 33 and 38 are being separated under the influence of the ram 45. Thereafter the motor A continues to run, causing further separation of the jets 33 and 38 until cam-follower 62 reaches the position shown in Fig. 4, whereupon contact 96 closes. The torch assemblies 25 and 26 have now been tilted almost to their normal positions with respect to carrier arms 9 and 10. The closing of contact 96 energizes coil 112, closing contactor 114, thus admitting a current supply from line lead 119 to the motor B and to the magnetic clutch 15, which is in shunt connection therewith. Return connection from the latter instrumentalities to line lead 120 is by direct connection, as shown. The closing of contactor 14 also energizes holding-coil 113 which derives its return connection to line lead 120 through the normally closed contactor 100 which is located at the stopping position and which will be described in greater detail hereinafter. This stage of the cycle is indicated by the vertical line F in Fig. 6.

Thereafter, the motor A continues to drive the cam 63 beyond the rise 140 back onto the flat portion 139 and the ram 45 is thereupon retracted by the spring 135. By this time the torch assemblies 25 and 26 have been tilted to their normal position with reference to the saddles 27 and 28. This phase of the cycle is shown in Fig. 12 and diagrammatically represented by the vertical line F' in Fig. 6. The motor A continues to run after stage F' until the indentation 136 causes contact 99 to open, thus de-energizing coil 102 which opens contactor 104. The condition of the cycle at this stage is diagrammatically indicated by the vertical line G in Fig. 6. The latter condition then continues while the carrier arms 9 and 10 travel as indicated by the arrows in Fig. 1 from the starting location to the stopping location.

The action taking place on the surface of the work piece during normal travel of the arms 9 and 10 with torch assemblies 25 and 26 in normal position is shown in Fig. 13. It will further be evident from an inspection of Figs. 10 to 13, both inclusive, that a flame-hardened case has been initiated at a single spot and then spread continuously from that spot in two directions around the periphery of the work piece.

Upon the arrival of the carrier arms 9 and 10 at the stopping location, as shown in Fig. 5, normally closed contact 100 is opened and normally open contact 101 is closed by engagement with actuator 121. The contacts 100 and 101 are placed one above the other so that they will be actuated as nearly simultaneously as possible. The opening of contact 100 breaks the supply of current to the holding-coil 106, thus opening contactor 107, causing the valve 95, which controls the supply of gas, to become closed. This extinguishes the flames. The condition of the surface of the work piece just prior to the extinguishing of the flames is indicated in Fig. 14 where the two independent heated zones are shown remerged into a single, final heated zone.

The opening of contact 100 also interrupts the supply of current to holding-coil 113, which opens contactor 114 and stops motor B. At the same time magnetic clutch 15 becomes released so that the carrier arms 9 and 10 can be driven in reverse direction without necessity for reverse driving of motor B. At the same time the closing of contact 101 energizes coil 115, causing contactor 117 to close. This places motor C in motion, the same being maintained in motion by reason of the action of holding-coil 116, which is supplied with current through the normally closed contact 118. This causes the push-rod 78 to move inwardly, causing the plow-shaped member 56 to advance toward the center of the machine.

By reference to Fig. 8 and to several of the other views, particularly Fig. 7, it will be observed that the member 56 is plow-shaped in form and is medially divided into a raised portion at the left and a lowered portion at the right. The raised portion carries a low inclination face 57, which has previously been referred to, and beneath and in advance of this a higher inclination face 68. The opposite side of the plow-shaped member 56 carries in lowered position the lower inclination face 58, previously referred to, and beneath and in advance of this a higher inclination face 70. The member 56 is thus formed so as to accommodate for the difference in level between the carrier arms 9 and 10 so that the parts carried on said carrier arms will be engaged in similar manner upon inward movement of the member 56.

During such inward movement the crank-pins 50 and 55, as previously described, are engaged by faces 57 and 58. At the same time depending pins 17 and 134, which are secured respectively to the saddles 27 and 28, are engaged by the faces 68 and 70. As a result of these engagements the carrier arms 9 and 10 are caused to move apart while the torch assemblies 25 and 26 are tilted inwardly with respect to the saddles 27 and 28. As the inward movement of the cam member 56 proceeds, the parts are moved from the position shown in Fig. 5 to the position shown in Fig. 7. During the latter part of this movement contact 111 opens, thus de-energizing coil 109, permitting the contactor 110 to open, and thus closing valve 88 which controls the supply of quenching fluid. Further travel of the cam member 56 then causes contact 118 to open, thus de-energizing coil 116, releasing contactor 117, and stopping the motor C.

The stages of the cycle just described are diagrammatically indicated by the vertical lines H, I, and J in Fig. 6.

At the conclusion of the treatment and just prior to the closing of valve 88, a complete, uninterrupted peripheral band of flame-hardening material will have been produced upon the work piece 24. The condition of the surface of the work piece at this stage of the treatment is diagrammatically indicated in Fig. 15.

The supporting-foot 37 of the torch assembly 25 and the corresponding supporting-foot 42 of the torch assembly 26 not only serve to steady and support the torch assemblies but also serve to releasably retain the torch assemblies in the several positions to which they are tilted. This is accomplished with the aid of the detent pins 126 and 127, which appear clearly in Fig. 8. The detent pins are rounded at their ends and are spring-backed, as shown, so as to adapt them to drop into small sockets in the respective saddles 27 and 28. The sockets are designated in Figs. 3, 4, 5, and 7 as 128, 129 and 130 in the case of saddle 27, and as 131, 132 and 133 in the case of saddle 28.

At the outset of movement, detent 126 is located within socket 128 and detent 127 is located within socket 131. After the outset of movement the torch assemblies are so tilted as to bring detent 126 into socket 129 and detent 127 into socket 132. At the conclusion of the cycle, detent 126 drops into socket 130 and detent 127 drops into socket 133. For more positive operation, if desired, the detent pins may be magnetically actuated and appropriately interlocked with the other electrical instrumentalities of the apparatus.

Throughout Figs. 3, 4, 5, and 7, and in order to clarify the showings therein, the work piece 24 has been shown in outline by means of dot-and-dash lines. The particular work piece shown is a flanged wheel, such as employed on the trucks of overhead cranes. The dotted line 122 represents the outer limit of the flange while the dotted line 123 represents the wearing surface of the tire to which the treatment is applied. If desired, the inner faces of the flanges may be treated simultaneously with the treatment of the tire by extending the flame and quenching fluid jets around the ends of the torches 33 and 38.

The apparatus above described in detail is but one of several forms which may be employed to perform the method of this invention, which method, in the form described first, produces a single heated spot on the surface of the work piece and then extends the heated spot laterally. While extension of the heated spot proceeds, a quenched spot in the center heated zone is initiated and this quenched spot is also extended laterally in step with the extension of the heated spot. This procedure is continued until the two ends of the laterally-extending heated spot rejoin, whereupon further heating is terminated and the quenched spot is extended until it likewise rejoins. In this way reheating and redrawing of any previously hardened portion of the work piece surface is avoided and an uninterrupted peripheral band of hardened material is produced.

While the method and apparatus of this invention have herein been described by reference to a specific instance of their embodiment and use, it is intended that the protection of Letters Patent to be afforded hereby be not unnecessarily limited by such instance described, the intent being that such protection shall extend to the full limit of the inventive advance disclosed herein as represented by the scope of the claims hereto appended.

I claim:

1. The method of hardening a path on the surface of an object formed of a quench-hardenable material, which consists in applying a pair of heat sources in side-by-side relation to a medial part of the path to be treated and then moving said sources away from one another along said path at such rates as to raise the temperature of surface layers in said path to hardening temperature, then while said movement of said heat sources is taking place and when the same have separated a predetermined distance impinging quenching fluid from a pair of separable quenching fluid sources upon the initially heated portion of said path to quench the same, dividing said quenching fluid sources while continuing the supply of fluid therethrough by causing the same to move away from one another, one each to follow one of said heat sources at a predetermined spacing behind the same, continuing said movements until all portions of said path have been raised to hardening temperature, and then removing said heat sources and continuing the movement of said quenching fluid sources until all heated portions have been quenched.

2. The method of hardening a path on the surface of an object formed of a quench-hardenable material, which consists in applying a heat source at each end of said path and then moving said sources toward one another along said path at such rates as to raise the temperature of a surface layer in said path to hardening temperature, then while said movement of said heat sources is taking place and, when the same have moved a predetermined distance, impinging quenching fluid from separate movable quenching fluid sources upon each of the initially heated portions of said path to quench the same, continuing the movement of said heat sources toward one another, followed at a predetermined distance by said moving quenching fluid sources until said heat sources create a unitary terminal zone, at hardening temperature, removing said heat sources and continuing the movement of said quenching fluid sources until they simultaneously act to quench said terminal heated zone.

3. The method of hardening an uninterrupted peripheral path around the surface of a round object formed of a quench-hardenable material, which consists in applying a pair of heat sources in side-by-side relation to a part of the peripheral path to be treated and then moving said sources away from one another along said peripheral path at such rates as to raise the temperature of surface layers in said path to hardening temperature, then while said movement of said heat sources is taking place and when the same have separated a predetermined distance impinging quenching fluid from a pair of separable quenching fluid sources upon the initially heated portion of said path to quench the same, then continuing the supply of fluid through said quenching fluid sources and dividing the same by causing them to move away from one another, one each to follow one of said heat sources at a predetermined spacing behind the same, continuing said movements of said heat and quenching fluid sources until said heat sources join again in side-by-side relation to form a unitary terminal zone of hardening temperature, removing said heat sources and continuing the movement of said quenching fluid sources toward one another until said terminal zone is quenched.

4. The method of flame-hardening an uninterrupted peripheral path around the surface of a quench-hardenable body which consists in controllably applying a pair of separable high temperature flames to an initial merged zone of heating on the surface of said body until said zone is raised to hardening temperature, then translating said flames away from one another at a controlled rate to raise extending surface paths on said body to hardening temperature, then applying to said initial merged zone a pair of separable supplies of quenching fluid to quench and harden said initial zone, continuing the movement of said flames at regulated rates over the surface of said body along paths which ultimately meet at a final merged zone on the surface of said body and simultaneously therewith separating said quenching fluid sources and translating the same away from one another at the respective rates and along the respective paths of said respective flames and at a predetermined spacing thereafter, continuing the movement of said heating flames and quenching supplies until said flames again merge, forming a final merged zone of heating, then removing said flames from said body, and finally continuing the movement of said quenching fluid supplies until they simultaneously act to quench said final zone of heating.

5. The method of flame-hardening an uninterrupted peripheral path on the surface of a quench-hardenable body which consists in applying a pair of combined quench and flame supply jets in a position inclining toward one another at their jet ends to a part of said path, igniting said flames so as to form a single initial heated zone on said path, tilting said jet ends of said jets away from one another to extend said heated zone and to bring the quench supply portions of said jets to bear upon the medial portions of said heated zone, initiating a supply of quenching fluid through said jets, continuing the tilting of said jets until they become substantially normal to said path, then moving said jets away from one another while maintaining them in positions substantially normal to said path and while preserving a substantially constant distance of the same from said path, continuing said movement while maintaining said flames and quench supplies until said jets meet to form a single terminal heated zone, extinguishing said flames, and then tilting said jets away from one another at their outer ends while continuing said quench supplies to cause the quench supply portions of said jets to progressively bear upon more and more closely approaching portions of said terminal-heated zone until said terminal zone has been completely quenched.

6. In an apparatus for flame-hardening a continuous peripheral path on the surface of a cylindrical object, the combination comprising means for mounting an object to be treated, a right-hand and a left-hand rotatable arm mounted for rotation about an axis concentric with said object, said arms being adapted to be moved to angular positions in close proximity to one another at diametrically opposed starting and stopping locations on opposite sides of said object, means for simultaneously rotating said arms at predetermined rates and in opposite senses of rotation from said starting location to said stopping location, a right-hand torch and a left-hand torch having combined flame and quenching fluid jets tiltably mounted respectively on said movable arms, said tiltable jets being so arranged that the quenching fluid jet portions thereof are adjacent when said arms are in starting position, means adapted to permit said torches, when in said starting position, to be tilted so that the quenching fluid jet portions thereof are withdrawn and the flame jet portions thereof are advanced to cause the same to converge and to direct the flames therefrom against points in close proximity to one another on said object, means for separately tilting said jets apart to a normal operating position with respect to said arms, means for establishing a supply of quenching fluid to said quenching fluid jet portions, means for initiating movement of said movable arms, means for bringing said arms to rest upon their arrival at said stopping location, means for simultaneously respreading said arms after the same have reached said stopping location, means for tilting said jets toward one another at their jet ends when said respreading movement takes place, and means for extinguishing the flames from the flame portions of said jets during said final tilting movement.

7. In an apparatus for flame-hardening a continuous peripheral path on the surface of a cylindrical object, the combination comprising means for mounting an object to be treated, a pair of torch supports relatively movable from and to one another around the periphery of said object from a starting location to a stopping location, torches mounted upon said supports positioned to direct their flames against the periphery of said object, means for moving said torches from the starting location to the stopping location and means for sequentially applying quenching fluid to the portions of said object which have been heated by said flames.

8. In an apparatus for flame-hardening a path on the surface of an object, the combination comprising means for applying flames in close proximity to one another at a point on said path, means for causing said flames to separate and move relative to one another away from one another along said path, means for sequentially impinging quenching fluid streams first against the point of initial heating of said path, and means for causing said streams to separate and follow said moving flames at a rate consonant with the rate of said flames and at a predetermined distance behind the same.

9. In an apparatus for flame-hardening a continuous peripheral path on a cylindrical object, the combination comprising means for applying a pair of flames in close proximity to one another at an initial point on said path, means for causing said flames to separate and move relative to one another away from one another along said path to a terminal point of close proximity to one another, means for sequentially impinging a pair of quenching fluid streams first against said point of initial heating of said path, and means for causing said streams to separate and follow said moving flames at a rate consonant with the rate of said flames and at a predetermined distance behind the same to a point of meeting of said streams.

10. In an apparatus for flame-hardening a peripheral path on the surface of a cylindrical object, the combination comprising a pair of torches adapted to emit heating flames and streams of quenching fluid, movable mounting means for said torches adapted to transport the same in opposite directions around the surface of an object to be treated, pivotal means between said torches and said mounting means to permit said torches to be tilted with respect to said mounting means, means for tilting said torches away from one another at the outset of their movement, and means for tilting said torches toward one another at the conclusion of their movement.

11. In an apparatus for flame-hardening a peripheral band on a circular object, the combination comprising a circular bed, means for mounting an object in the center of said circular bed, a pair of carrier arms mounted for rotative movement in opposite directions upon said circular bed, said carrier arms being adapted to move from a starting location in close proximity to one another to a stopping location in close proximity to one another in a position on said bed diametrically opposed to said starting location, a combined flame and quench supply torch tiltably mounted on each of said arms, a radially disposed ram mounted at said starting location and adapted to engage said torches to tilt the same when said carrier arms are in said starting location, means for moving said carrier arms, and a radially-disposed ram positioned at said stopping location and adapted to respread said carrier arms after the arrival at said stopping location and to simultaneously tilt said tiltable torches.

12. In combination with the apparatus defined by claim 11 of means associated with the starting location ram adapted to mechanically drive the same, means actuated thereby adapted to place in motion and drive the carrier arms, and means actuated by the arrival of said carrier arms at the stopping location for driving said stopping location ram.

13. In an apparatus for flame-hardening a peripheral path on a cylindrical object, the combination compriisng a circular bed, means associated with said bed for mounting a circular object to be treated in a position coaxial with said bed, a pair of movable carrier arms mounted for rotative movement about the axis of said object from a starting location in close proximity to one another and a stopping location in close proximity to one another on the opposite side of said bed, a motor for driving said arms simultaneously in opposite directions of rotation, a magnetically-actuated clutch for connecting and disconnecting the driving connection between said motor and said arms, a combined flame jet and quenching fluid jet torch tiltably mounted on each of said arms normally facing inwardly with respect to said bed in flame-hardening relationship with the periphery of said object, a radially-disposed ram positioned at said starting location adapted to engage said tiltable torches and to tilt the same from a converging starting position to said normal position, a motor for driving said ram, a radially-disposed ram positioned at said stopping location adapted to reseparate said carrier arms and to tilt the said torches from normal position to a convergent position upon arrival of said arms at stopping location, a motor for driving said stopping position ram, a magnetically-controlled valve for admitting flame producing gases to said torches, a second magnetically-controlled valve for admitting quenching fluid to said torches, a starting switch for supplying current to said starting position ram motor and for causing said gas supply valve to be opened, a motor-actuated switch actuated by predetermined movement of said starting ram motor for causing said quenching fluid valve to be opened, a second motor-actuated switch actuated by said starting position ram motor for causing said carrier arm driving motor and said magnetic clutch associated therewith to drive and establish driving connection with said carrier arms, means for causing the driving of said starting location ram motor to be terminated after a predetermined interval, a switch for causing said carrier arm driving motor and said magnetic clutch associated therewith to be deenergized, means adapted to cause said flame gas supply valve to become closed upon arrival of said carrier arms in said stopping location, a switch for energizing said stopping location ram driving motor upon arrival of said carrier arms in said stopping location, means for causing said quenching fluid control valve to be closed after a predetermined movement of said stopping location ram, and means for deenergizing said stopping location ram driving motor.

14. In a mounting for flame-hardening torches adapted to carry said torches around the periphery of a circular object, the combination comprising a pair of radial arms secured one above the other upon separate quill shafts surrounding a central gudgeon post, a gear engaging each of said quill shafts, a pinion meshing with each of said gears, means for mounting an object to be treated upon said center gudgeon, and means for driving said pinion.

15. In a mounting for flame-hardening torches adapted to carry said torches around the periphery of a circular object, the combination comprising a pair of radial arms secured one above the other upon separate quill shafts surrounding a central gudgeon post, a gear engaging each of said quill shafts, a pinion meshing with each of said gears, means for mounting an object to be treated upon said center gudgeon, and a drainage basin having a bottom and upstanding side portions surrounding said quill shafts and disposed beneath said arms.

16. In a mounting for flame-hardening torches adapted to carry said torches around the periphery of a circular object, the combination comprising a pair of radial arms secured one above the other upon separate quill shafts surrounding a central gudgeon post, a gear engaging each of said quill shafts, a pinion meshing with each of said gears, means for mounting an object to be treated upon said center gudgeon, a radially-adjustable saddle mounted upon each of said arms, and normally inwardly-facing tiltable flame-hardening torches tiltably mounted upon each of said saddles.

17. In a flame-hardening torch and mounting therefor adapted for use in apparatus of the type described, the combination comprising a saddle adapted for mounting upon a carrier arm, a vertical pivot post extending upwardly from said saddle, a combined flame and quenching fluid supply jet member mounted upon said vertical pivot post, detent means for releasably holding said torch in normal position, and means adapted to be engaged by tilting means for causing said torch to be tilted to and from said normal position.

18. In an apparatus for flame-hardening a peripheral path upon a circular object, the combination comprising a pair of carrier arms radially mounted with respect to the axis of the object to be treated, means for moving said arms from a starting location on one side of said object to a stopping location on the opposite side of said object, a normally inwardly directed flame-hardening torch mounted upon each of said arms in position to act to flame-harden the surface of said object, means adapted to permit said torches to be convergently inclined when in said starting location, means for causing said arms to carry said torches in opposite directions around the periphery of said object, means for causing said torches to move from convergent position to normal position at the outset of the movement of said carrier arms, a radially-disposed ram positioned at said stopping location, said ram having plow-shaped surfaces upon its advancing face, abutments associated with said arms positioned to be engaged by said plow-shaped face when said ram is advanced whereby said arms are caused to separate, and means associated with said tiltable torches positioned also to be engaged by parts of said plow-shaped surface to cause said torches to be tilted from normal position to a convergent position while said carrier arms are being separated.

ROBERT BAXTER MITCHELL.